United States Patent [19]

Ceurvels et al.

[11] Patent Number: 4,529,881

[45] Date of Patent: Jul. 16, 1985

[54] FLAME DETECTOR WITH TEST LAMP AND ADJUSTABLE FIELD OF VIEW

[75] Inventors: Thomas J. Ceurvels, Wollaston; Rashid A. Chaudhary, East Weymouth; Charles F. Doherty, Jr., Quincy, all of Mass.

[73] Assignee: Pyrotector, Inc., Hingham, Mass.

[21] Appl. No.: 353,905

[22] Filed: Mar. 2, 1982

[51] Int. Cl.[3] .......................... G01J 5/04; G08B 17/12

[52] U.S. Cl. ...................................... 250/353; 250/372

[58] Field of Search ........................ 250/353, 342, 372; 340/578; 374/208

[56] References Cited

U.S. PATENT DOCUMENTS

| | | | |
|---|---|---|---|
| 3,952,196 | 4/1976 | Larsen | 250/372 |
| 4,369,364 | 1/1983 | Kuntermann | 250/227 |
| 4,435,093 | 3/1984 | Krause et al. | 374/129 |
| 4,464,575 | 8/1984 | Cholin et al. | 250/554 |

*Primary Examiner*—Bruce C. Anderson
*Assistant Examiner*—Constantine Hannaher

[57] ABSTRACT

A radiation detector for use in hazardous locations, comprising an explosion proof housing with a viewing window and a detector element positioned inside the housing to receive radiation through the viewing window, and means within the housing to apply test radiation onto the external face of the viewing window directly. In one embodiment of the invention the viewing window is recessed in a housing cavity with a flared wall and the test radiation is applied from a housing portion that extends forwardly of the plane of the viewing window. In a preferred embodiment of the invention the housing is formed of front and rear portions which are rotatable in relation to each other, and the viewing window is mounted in a surface of the front portion which is inclined at a 45° angle to the axis of rotation of the portions, and the rear portion has mounting means enabling mounting of the detector so that it can rotate about an axis disposed at a 45° angle to the axis of rotation of the portions, thereby allowing adjustment of the detector to view in any desired direction.

6 Claims, 5 Drawing Figures

FLAME DETECTOR WITH TEST LAMP AND ADJUSTABLE FIELD OF VIEW

BACKGROUND OF THE INVENTION

Ultraviolet and infra-red detectors are often used as flame detectors in installations where the flame may be the result of an explosion, such as in petro-chemical plants, storage areas for flammable liquids, and the like. Obviously the detector must survive any explosion and provide an alarm signal, and therefore the detector element must be enclosed in an explosion proof housing, and view the area to be protected through an explosion proof window. By enclosing the detector in an explosion proof housing, the detector is permitted by certain industrial requirements to be used in areas in which explosive gases may occur, since the detector has no exposed wiring or electrical apparatus that might produce a spark.

It is also essential that such a detector have means for checking its operability, including the light transmittance of the viewing window and the operability of the circuitry, in response to incident radiation.

Although it is possible to test such detectors by exposing them to an artificial source of radiation of the type that the detector is intended to detect, this method of testing is inconvenient and time-consuming in installations having many detectors, some of which may be relatively inaccessible.

Although external test lamps have been provided for such detectors, such an arrangement does not satisfy the requirements of certain industry specifications, which require that the test lamp be positioned inside the explosion proof housing for the reasons mentioned above.

Systems are known in which the test lamp is positioned inside the housing, and arranged to project radiation out through the viewing window to a reflecting surface, which reflects the test light back through the window and onto the detection cell.

However such systems can give a false indication of inoperativeness, since the test light must pass twice through the viewing window, and must be reflected from a surface which may be covered with an accumulation of dirt, whereas radiation from a fire must pass through the window only once. Although a false signal of inoperability is obviously preferable to a false signal of operability, nevertheless such a system can cause personnel to perform maintenance work on the detector system when it is not needed, and can cause other inconvenience, such as plant shut-down during the period of suspected inoperability of the detector.

SUMMARY OF THE INVENTION

This invention provides a flame detector which includes a detector cell and a test lamp positioned to cause radiation to fall on the cell when the test lamp is energized, with all of the components being enclosed in an explosion proof housing. The detector cell is positioned in the housing behind an explosion proof viewing window, and a test lamp housing is mounted in an aperture disposed adjacent to the viewing window. The test lamp housing has a window positioned on the forward end thereof on the side adjacent to the cell viewing window, with the test lamp and window being so positioned and oriented that light from the test lamp is directed rearwardly onto the front surface of the viewing window.

In a preferred embodiment of the invention the detector housing is formed of front and rear portions which are rotatable in relation to each other, with the cell viewing window being so positioned in the front housing portion that the axis of its field of view is at an angle of 45° to the axis of rotation of the housing portions in relation to each other, and the rear portion has mounting means such as a threaded aperture about which the entire detector can rotate, said axis of rotation about the mounting means being at a 45° angle to the axis of rotation between the two housing portions. Thus the field of view of the detector can be adjusted to any desired direction.

DESCRIPTION OF THE ILLUSTRATED EMBODIMENT

Figure 1:
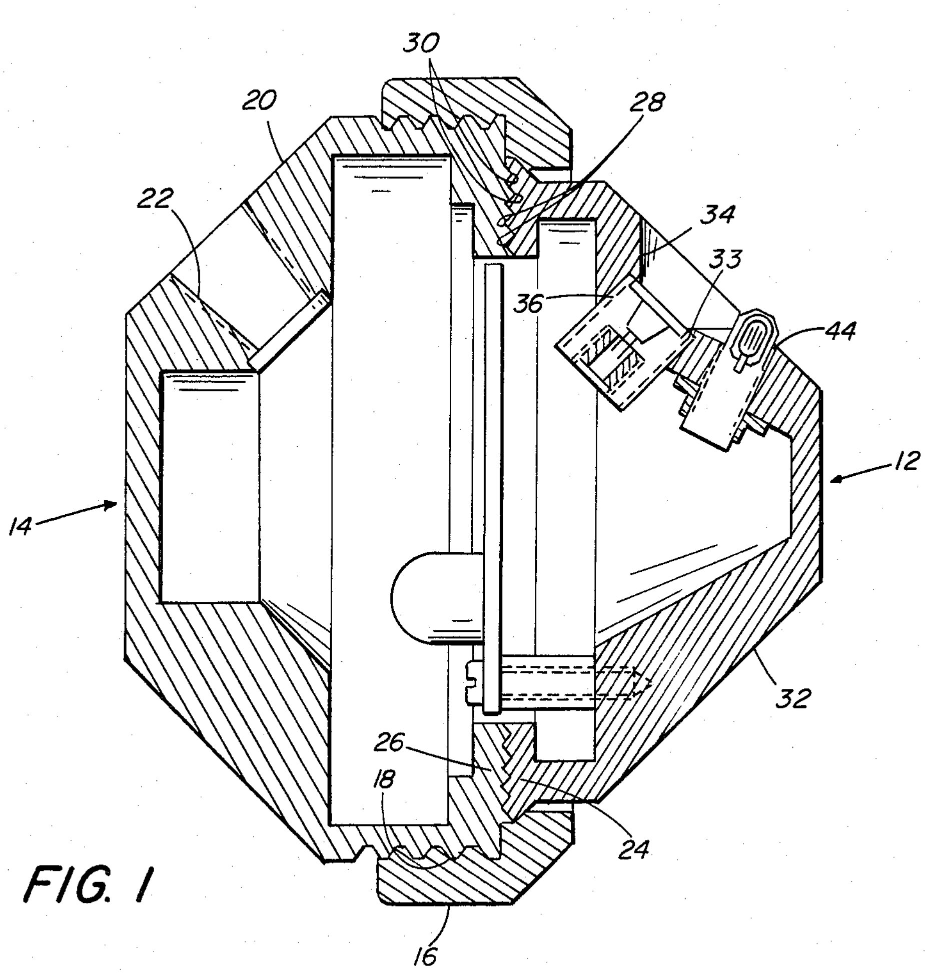
FIG. 1 is a view in section of the front portion of a housing of a flame detector embodying the features of the invention.
Figure 2:
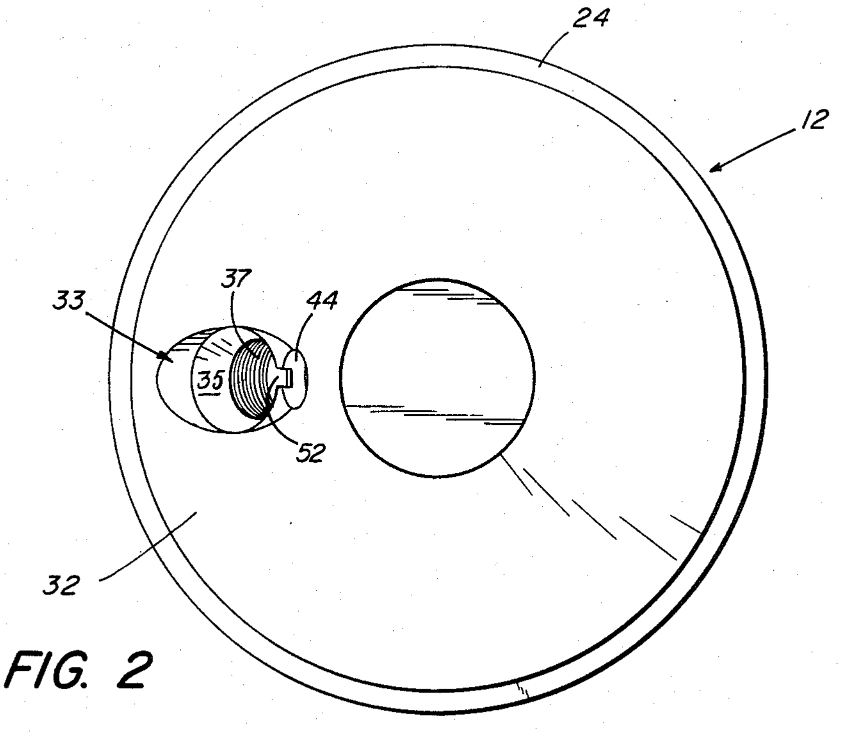
FIG. 2 is a view of the housing portion of FIG. 1 as seen from the left or front side.
Figure 3:
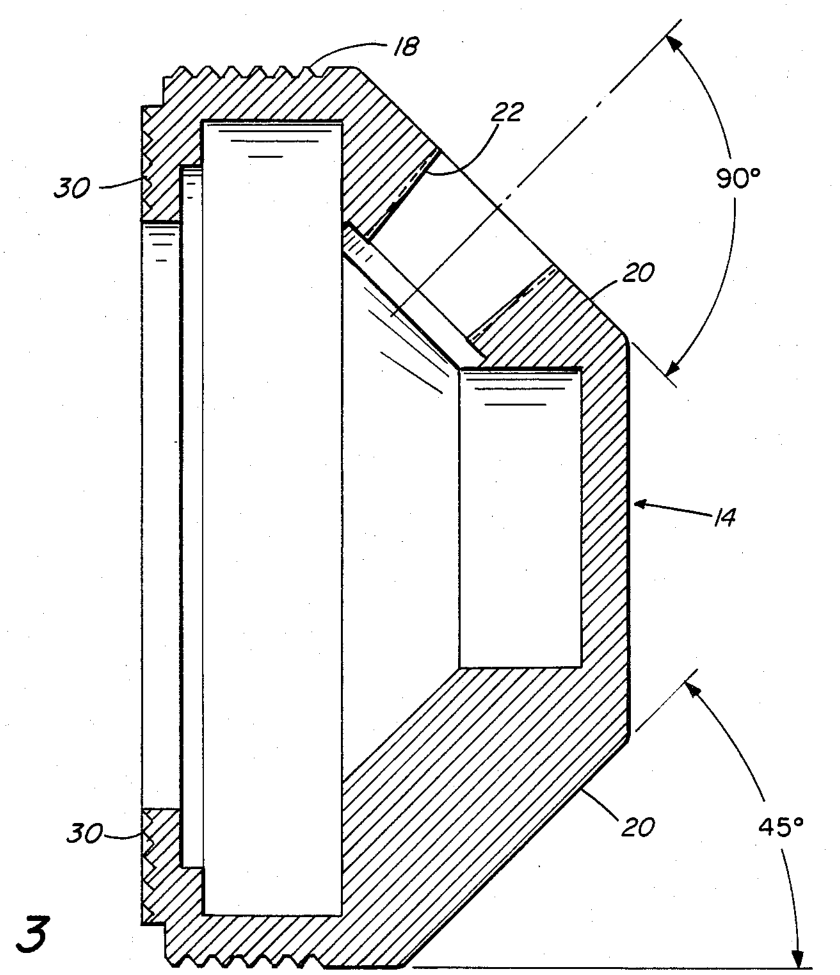
FIG. 3 is a view in section of the rear portion of a housing of a flame detector embodying the features of the invention.
Figure 4:
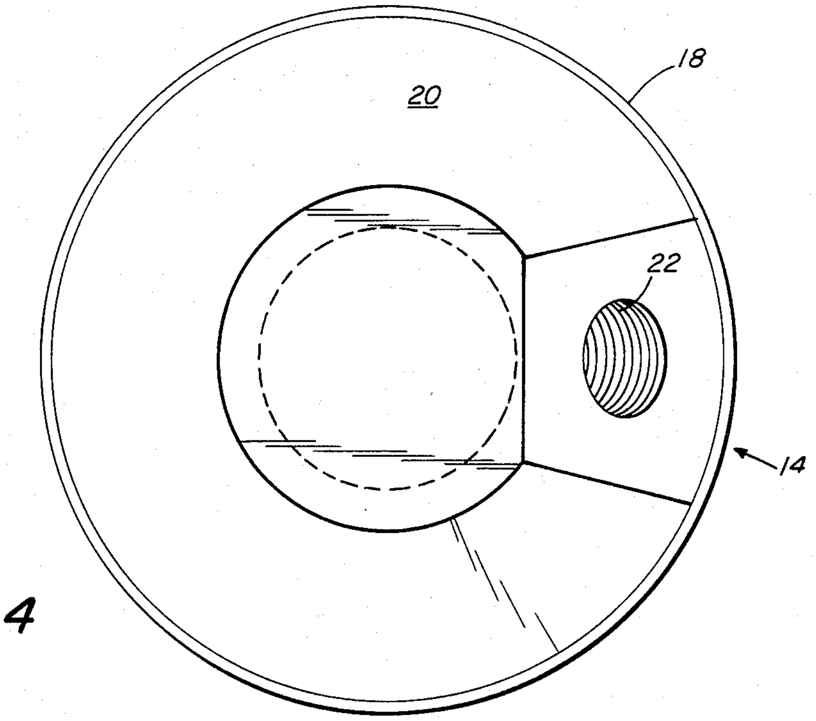
FIG. 4 is a view of the housing portion of FIG. 3 as seen from the right or rear side.
Figure 5:
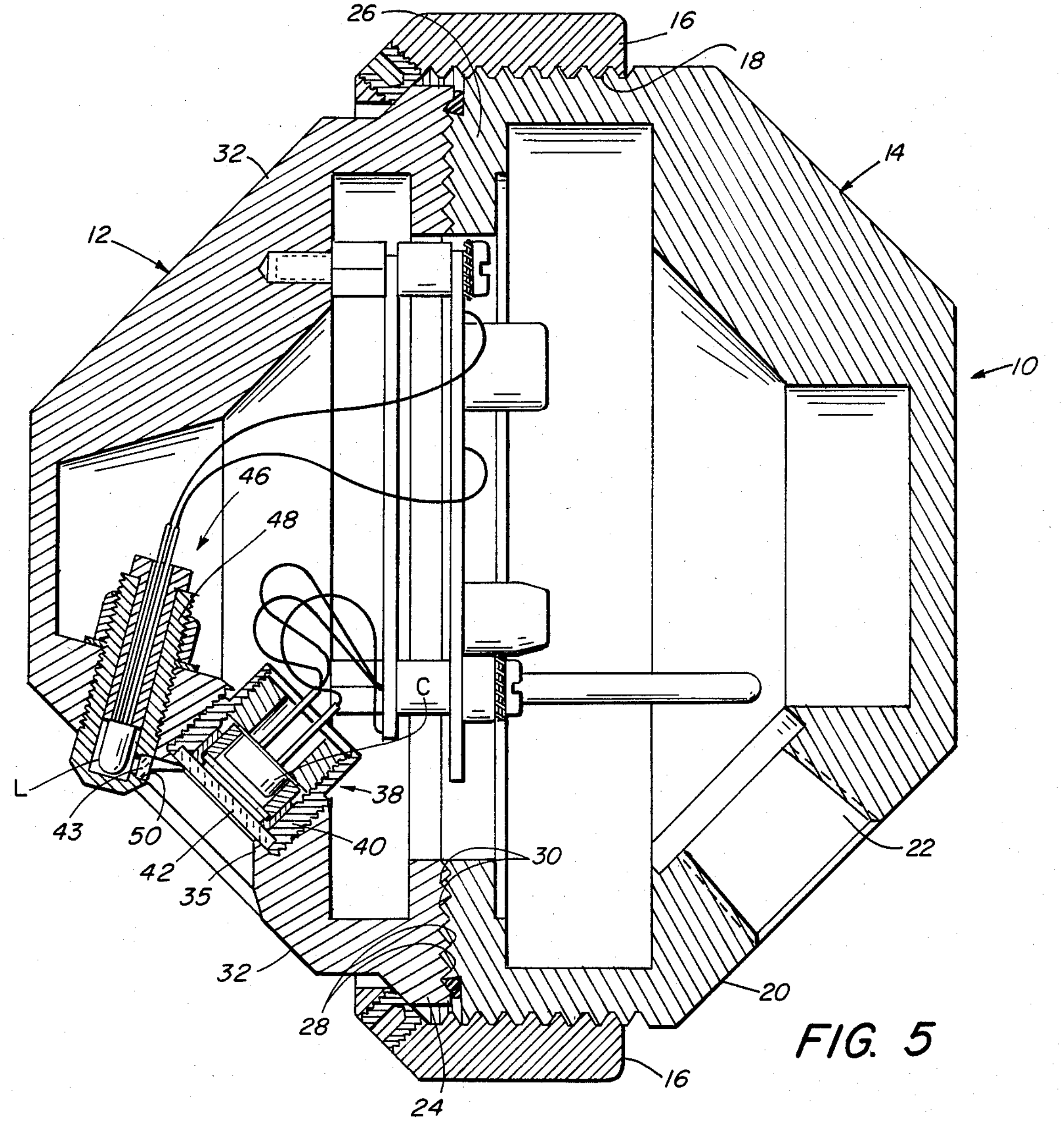
FIG. 5 is a view in section of flame detector embodying the features of the invention, utilizing the housing portions of FIGS. 1-4.

Referring to the drawings, there is illustrated a radiation detector which comprises a housing 10, which includes a front portion 12, a rear portion 14 and an internally threaded retaining ring 16.

The rear portion 14 of the housing has a circular peripheral portion 18 which is externally threaded to receive the retaining ring 16 and a rear surface portion 20 disposed at a 45° angle to the axis of the peripheral portion 18. Formed in the surface 20 is an internally threaded mounting aperture 22, the axis of which is perpendicular to the surface 20.

The front portion 12 of the housing has a rear peripheral flange portion 24 and a rear surface 26 which is provided with a series of circular grooves 28 dimensioned to mate with corresponding lands 30 on the forward surface of the rear portion 14 of the housing.

The forwardly extending portion of the housing portion 12 has a frusto-conical outer surface 32 which is disposed at a 45° angle to the plane of the rear surface 26.

An aperture 33 is formed in the surface 32, said aperture having an outer flared portion 34 bounded by a frusto-conical wall 35 and an inner portion 36 formed by a circular threaded wall 37.

A detector cell assembly 38 is threaded into engagement into the inner portion 36 of the aperture 33, said assembly comprising an externally threaded retainer 40, a detector cell C mounted in the retainer 40, and a viewing window 42 retained in the retainer 40 in front of the cell C. The cell C is positioned to view a volume of space outside the housing through the window 42 and the outer flared aperture portion 34.

The cell C may be connected to suitable circuitry (not shown) to cause an alarm or other signal if radiation of the type to be detected (such as infrared or ultraviolet) falling on the detector exceeds a predetermined intensity.

To provide means for applying test radiation onto the cell C, a threaded aperture 44 is provided in the surface 32 closely adjacent to the aperture 33 and at an angle thereto, and a test lamp assembly 46 is assembled into the aperture 44, said assembly 46 comprising a housing 48 so dimensioned that when assembled into the aperture 44, the forward end thereof protrudes from the surface 32 and extends beyond the plane of the window 42.

The forward end of the test lamp housing 48 is provided with an aperture 50 which is positioned on the side of the housing 48 adjacent the window 42, said aperture being closed by a transparent window 43 of explosion proof material. A test lamp L, which is capable, when energized, of providing radiation of the type to which the cell C responds is positioned in the housing in such relation to the aperture 50 that radiation from the lamp L can pass out of said aperture. The fact that the end of the housing 48 is positioned forwardly of the plane of the window 42 and the fact that the axis of the test lamp housing is inclined in relation to the axis of the window aperture 33 allows light from the test lamp to radiate rearwardly onto the forward face of the viewing window and hence onto cell C.

In the illustrated embodiment, to avoid having the housing extend any further forward than necessary, so as to block the view of the cell as little possible, a slot 52 is provided in the wall 35 of the cell aperture in alignment with the aperture 50 and the center of the viewing window 42 to allow light from the test lamp L to pass therethrough to reach the viewing window.

Therefore radiation from the test lamp, to reach the cell C, passes only through window 50 and window 42, and none of said radiation is received on the cell by reflection from any surrounding portion of the housing structure. Since the test lamp is completely enclosed in the explosion proof housing, the requirements of certain industrial standards are complied with.

The fact that the front and rear portions of the detector can rotate about each other, and the fact that the axis of view of the detector cell and the axis of rotation of the detector on the mounting means are both disposed at a 45° angle to the axis of rotation of the detector portions in relation to each other enables the field of view of the detector to be adjusted to any desired direction.

Since certain changes apparent to one skilled in the art may be made in the herein disclosed embodiment of the invention, it is intended that all matter contained herein be interpreted in an illustrative and not a limiting sense.

We claim:

1. A flame detector comprising a housing, a viewing window in the housing surface and a detector cell positioned in the housing to view an external space forwardly through the viewing window, said housing having a portion extending forwardly from the plane of the viewing window, said housing containing a test lamp which, when energized, produces radiation of a type to which the detector responds, and means within said portion defining a light path from said test lamp, constructed and arranged to direct radiation from the test lamp to fall on the external surface of the viewing window directly at an acute angle relative to the normal to said window, substantially without obscuring the field of view of said detector cell and without reflection from any external source, whereby light from said test lamp can pass though said window to said detector cell to closely simulate the effect on the detector of radiation from a flame to be detected.

2. A flame detector comprising a housing having a recess in one surface, an aperture at the bottom of the recess, a viewing window closing said aperture, and a detector cell positioned in the housing so as to view an external space through said window, said housing having a test lamp retaining portion disposed alongside said recess in a manner to substantially avoid obscuring the field of view of said detection cell, the forward end of which is disposed forwardly of the plane of the viewing window, and a test lamp window in said portion positioned to allow radiation from the test lamp to fall onto the external surface of the viewing window at an acute angle relative to the normal to said window, without reflection from any external surface.

3. A flame detector as set out in claim 2 in which said test lamp retaining portion comprises a removable test lamp housing disposed in a test lamp housing aperture disposed alongside the viewing window, said test lamp window being disposed in the end of said test lamp housing adjacent said viewing window.

4. A flame detector as set out in claim 3 in which said test lamp housing aperture is inclined toward the axis of the viewing window and said test lamp window is positioned in said test lamp housing on the side adjacent to the viewing window, so that radiation from said test lamp window is directed rearwardly onto the surface of the viewing window.

5. A flame detector housing comprising
front and rear portions rotatably retained together,
said rear portion having a mounting means positioned and arranged to enable said detector housing to be mounted in a manner to allow rotation of the housing about an axis disposed at a 45 degree angle to the axis of rotation of said front and rear portions, and
a viewing window in the front portion,
said viewing window having a viewing axis disposed at a 45 degree angle to the axis of rotation of the front and rear portions.

6. A detector housing as set out in claim 5 in which a front surface of said front portion of the housing and a rear surface of said rear portion of the housing are inclined at an angle of 45 degrees to the axis of rotation of said front and rear portions, said mounting means of said rear portion being disposed on said rear surface of said rear portion and said viewing window being disposed in said front surface of the front portion.

* * * * *